(12) United States Patent
Schlarb et al.

(10) Patent No.: US 9,182,994 B2
(45) Date of Patent: Nov. 10, 2015

(54) LAYERING OF BUSINESS OBJECT MODELS VIA EXTENSION TECHNIQUES

(75) Inventors: Uwe Schlarb, Oestringen (DE); Daniel Figus, Wallduern (DE); Stefan Baeuerle, Rauenberg-Rotenberg (DE); Michael Hartel, Heidelberg (DE); Toralf Grossmann, Nussloch (DE)

(73) Assignee: SAP SE, Walldorf (DE)

( * ) Notice: Subject to any disclaimer, the term of this patent is extended or adjusted under 35 U.S.C. 154(b) by 193 days.

(21) Appl. No.: 13/552,388

(22) Filed: Jul. 18, 2012

(65) Prior Publication Data

US 2014/0026114 A1    Jan. 23, 2014

(51) Int. Cl.
G06F 9/44    (2006.01)
G06Q 10/06    (2012.01)

(52) U.S. Cl.
CPC *G06F 9/44* (2013.01); *G06Q 10/06* (2013.01); *G06F 9/443* (2013.01)

(58) Field of Classification Search
None
See application file for complete search history.

(56) References Cited

U.S. PATENT DOCUMENTS

| | | | | |
|---|---|---|---|---|
| 2006/0075382 A1* | 4/2006 | Shaburov | | 717/106 |
| 2007/0157167 A1* | 7/2007 | Brendle et al. | | 717/120 |
| 2007/0162485 A1* | 7/2007 | Haeberle et al. | | 707/102 |
| 2007/0169016 A1* | 7/2007 | Aakolk et al. | | 717/136 |
| 2008/0005152 A1* | 1/2008 | Kraft et al. | | 707/102 |
| 2008/0010074 A1* | 1/2008 | Brunswig et al. | | 705/1 |
| 2010/0057504 A1* | 3/2010 | Baeuerle et al. | | 705/7 |
| 2010/0057771 A1* | 3/2010 | Baeuerle et al. | | 707/103 R |
| 2010/0057776 A1* | 3/2010 | Baeuerle et al. | | 707/104.1 |
| 2012/0023187 A1* | 1/2012 | Pohlmann et al. | | 709/213 |
| 2012/0054720 A1* | 3/2012 | Klein et al. | | 717/125 |
| 2012/0174064 A1* | 7/2012 | Polly et al. | | 717/120 |
| 2014/0019429 A1* | 1/2014 | Driesen et al. | | 707/703 |
| 2014/0019934 A1* | 1/2014 | Schlarb et al. | | 717/104 |
| 2014/0032441 A1* | 1/2014 | Schlarb et al. | | 705/348 |

* cited by examiner

*Primary Examiner* — Don Wong
*Assistant Examiner* — Roberto E Luna
(74) *Attorney, Agent, or Firm* — Mintz Levin Cohn Ferris Glovsky and Popeo, P.C.

(57) ABSTRACT

An extension node can be defined in a second layer of a software architecture for a first business object existing in a first layer and originally having an association with a second business object that is also in the first layer. The extension node can be defined to have an association with the second business object existing in a second layer of the software architecture. The association of the second business object can be altered from the first business object to the extension node so that at run time, metadata defining one or more nodes of the first business object and the extension node can be read from a metadata repository and a run time version of the first business object can be constructed at run time in a run time business object load based on the metadata.

10 Claims, 7 Drawing Sheets

LAYERING OF BUSINESS OBJECT MODELS VIA EXTENSION TECHNIQUES

TECHNICAL FIELD

The subject matter described herein relates to layering of business object models and interdependencies of objects between layers.

BACKGROUND

Complex software architectures, in particular business software architectures such as enterprise resource planning (ERP) systems can often be built in multiple development layers. A foundation layer, which can typically include core functionality as well as technical infrastructure, can serve as a first layer. The core functionality can in some examples include a base user interface framework, data analytics engines, an enterprise services framework (ESF), or the like. As used herein, an ESF can support the aggregation of service entities, such as for example Web services, software applications, software components, software modules, or the like, to form business level applications. The core software functionality can also include some application functionality, such as for example a business partner application, which enables management of roles, permissions, data creation and retention, and the like for outside entities that interface with the software architecture.

Using conventional approaches, objects that are part of the foundation layer can also contain references to other objects, which may not belong to the primary target content of the foundation layer. In this manner, inter-object dependencies can exist across more than one layer of the software architecture. If not all layers are present in an installation of the software, this can result in a breaking of these cross-layer dependencies.

SUMMARY

Implementations of the current subject matter can provide an approach to supporting cross-layer dependencies between objects in a layered software architecture that do not break when a second layer is not present in a software installation. This effect can be achieved through creating, in a second layer of the software architecture, an extension of a business object in a first layer of the software architecture such that a part of the business object in a lower layer (e.g. a foundation layer) that carries associations can be modeled as a business object extension in a higher layer. In one aspect, a method includes defining, for a first business object existing in a first layer of a software architecture and having an association with a second business object existing in a second layer of the software architecture, an extension node in the second layer; altering the association of the second business object from the first business object to the extension node; reading, at run time from a metadata repository, metadata defining one or more nodes of the first business object and the extension node; and constructing, at run time in a run time business object load, a run time version of the first business object based on the metadata, the run time version of the first business object comprising the one or more nodes of the first business object and the extension node.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
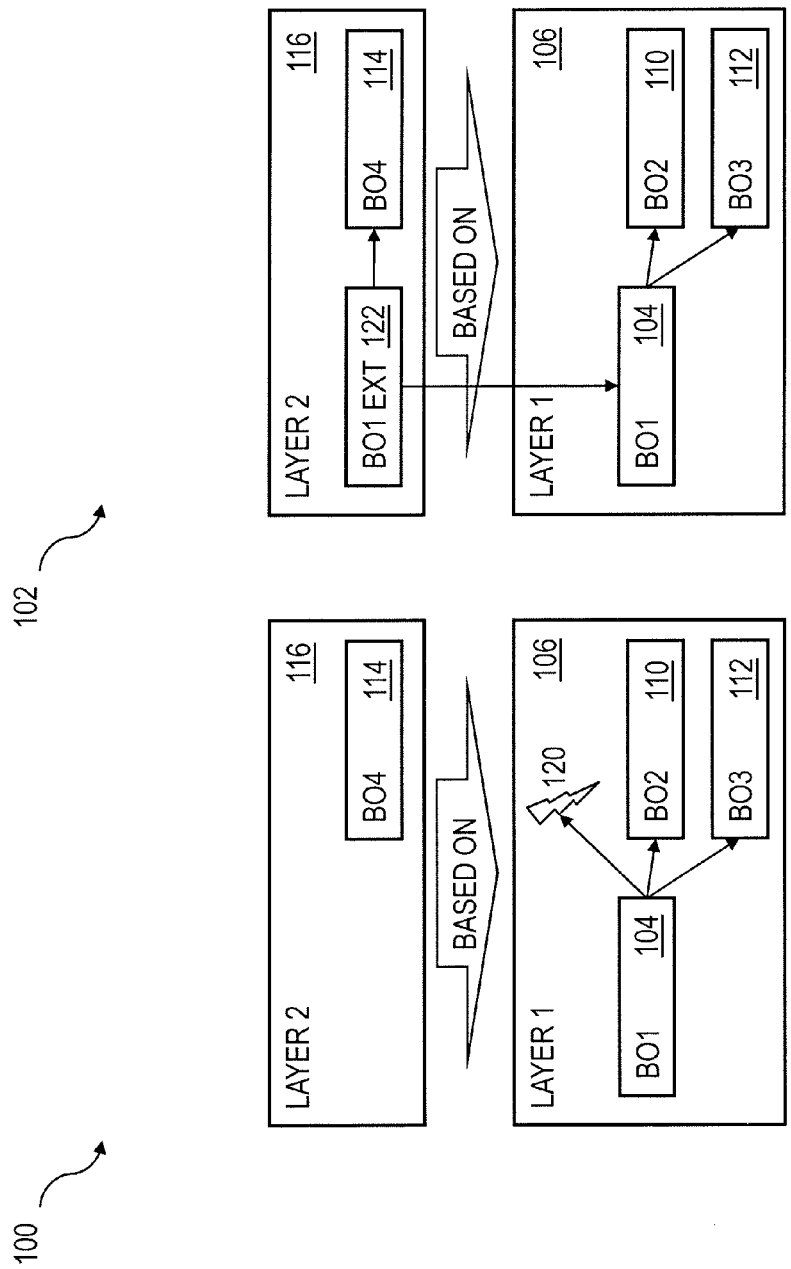
FIG. 1A is a diagram showing a first example of handling of cross-layer dependencies in a layered software architecture.
FIG. 1B is a diagram showing an example of improved handling of cross-layer dependencies in a layered software architecture consistent with implementations of the current subject matter.

FIG. 1A and FIG. 1B illustrate two examples 100 and 102 of layered software architectures in which cross-layer dependencies exist. In a first example of a conventional approach illustrated by reference to the first software architecture 100 shown in FIG. 1, a first business object 104 existing in a first layer 106 of the software architecture 100 has at least one association with each of three other business objects: a second business object 110, a third business object 112, and a fourth business object 114. The fourth business object 114 exists in a second layer 116 of the software architecture 100 and therefore is not part of the target content of the first layer 106. Accordingly, if the second layer 116 is not present in an installation, a broken dependency and a syntactical error 120 occurs for the reference from the first business object 104 to the fourth business object 114 because the fourth business object 114 does not exist in such an installation. As used herein, an association between two business objects can include one or more of a dependency of a second business object on the first business object, a reference from the second business object to the first business object, or the like.

Consistent with implementations of the current subject matter, an improved approach can be understood with reference to the software architecture with cross-layer extensions 102 shown in FIG. 1B. In this approach, an extension node 122 is created in the second layer 116. This additional sub-component can be a new business object model that extends the core business object model of the first business object 104. The extension node 122 can include characteristics similar to the core business object model of the first business object 104, but need only contain delta information reflecting the association between the first business object 104 and the fourth business object 114. Additionally, the extension node 122 can be located in a package and software component of the second layer 116 and can therefore be transported separately from the first layer 106. Also consistent with some implementations of the current subject matter, the core business object model of the first business object 104 can be extensible in all of its sub-components, such as for example nodes, attributes of nodes, associations, actions, determinations, validations, and the like.

One potential application of features consistent with implementations of the current subject matter can arise in a scenario in which all business objects originally exist in a first layer 106. One or more of the business objects originally in the first layer 106 (e.g. the fourth business subject 114 and its corresponding association can desirably be moved to the second layer 116, for example to make the first layer 106 leaner.

As depicted in FIG. 1, an extensibility concept consistent with implementations of the current subject matter can be used to define new associations via extensibility in the second (upper) software layer 116. This approach can avoid placing a target business object (in this example the fourth business object 114 into the first (lower) software layer 106. As such, the first software layer 106 is required to include fewer components, thereby allowing a leaner build of the layer with commensurate lower storage and memory requirements as well as improved run time performance.

At run time, the metadata can be read (for example from a metadata repository as discussed below) and converted into a run time format, which can be stored in a run time buffer or the like, for example in at least one of the database itself, in system memory, and the like. In other words, a run time version of the extended business object can be constructed as part of the run time BO load to include the nodes of both the core business object model and one or more extensions to the core business object model. In some implementations of the current subject matter, client dependent extensions (e.g. tenant specific extensions such as are described below in relation to FIG. 6 and FIG. 7) can also be supported (e.g. when a partner has added new validations, determinations, etc.). The result of this approach can be an extended business object model containing more nodes, associations etc. than the original core business object model of the first business object 104. Nevertheless all the additional sub-entities can appear now as if they were defined as part of the core business object model of the first business object 104. In other words, the names of these new sub-entities can all be addressed to start with "BO1" as would a node of the original business object model of the first business object 104.

Figure 2:
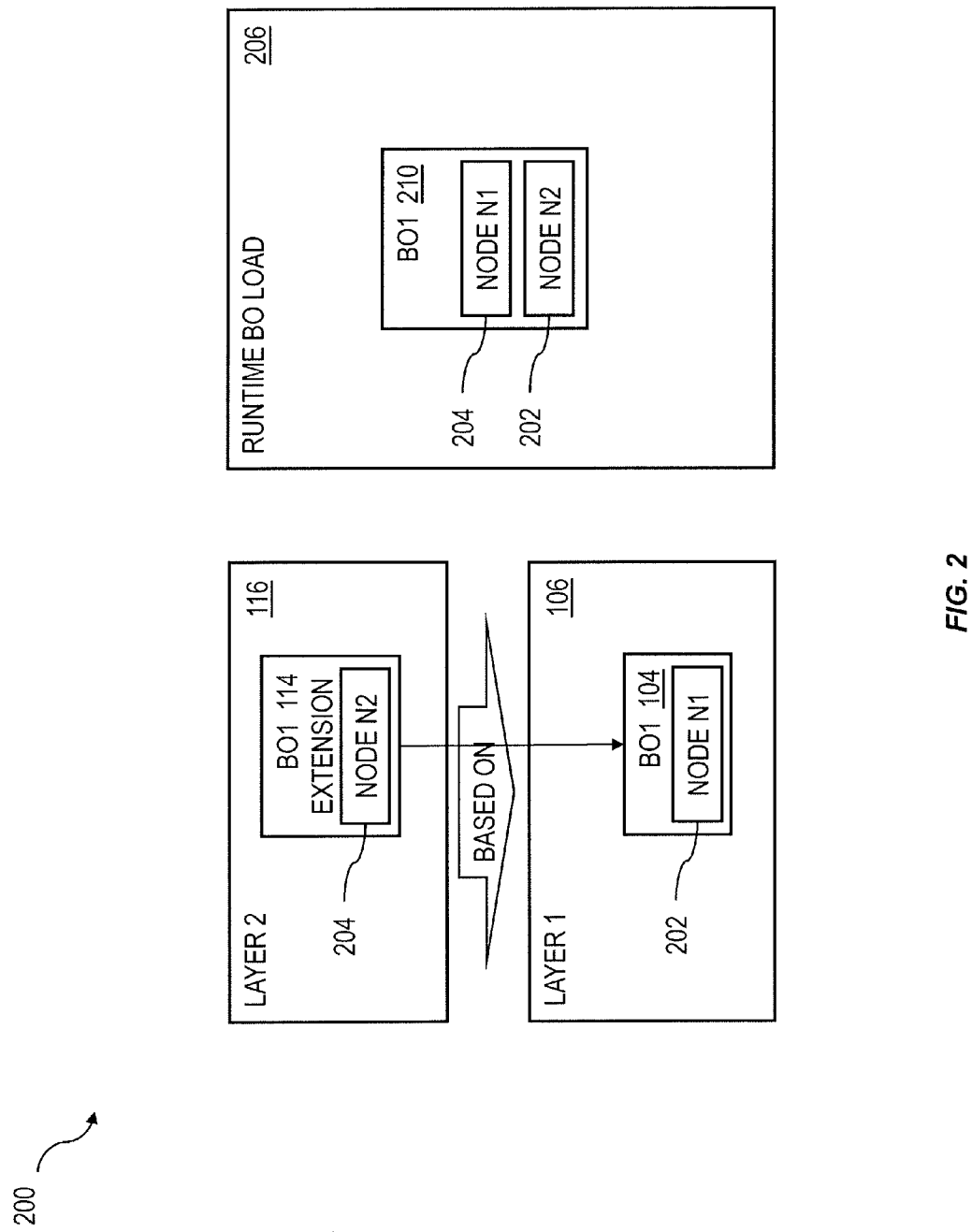
FIG. 2 is a diagram showing features related to run time treatment of a business object and its extension consistent with implementations of the current subject matter.

As an example of this feature, in a core business object model of the first business object (BO1) 104, a first node (N1) 202 can be defined as shown in FIG. 2. A consumer can read this node "BO1-N1" via a local client proxy (LCP) call or the like. As part of adding the first business object extension (BO1 Extension) 114 in the second layer 116 can include adding a new node (N2) 204. A consumer can address this node via "BO1-N2" such that the name of the extension BO is irrelevant for the consumer. At run time, a run time BO load 206 can include a run time version 210 of the first business object that includes nodes from the core business object (BO1) 104 and from the first business object extension (BO1 Extension) 114.

Because the nodes from business object extensions used in the manner discussed above can be combined into a run time version 210 of the business object, in the event that more than one business object extension created to maintain cross-layer association and dependencies of the business object, it can be important to ensure that the resulting logical view of the run time version 206 of the business object be resolvable consistently for all of its extensions. One approach to addressing this issue is to avoid naming collisions between the sub-entities created in the various cross-layer extensions.

Given the example of FIG. 2, a problem can occur if, in a new release, a node named N2 is defined in the core BO model. Because this node name is also used in the extensions, two node definitions for "BO1-N2" would result, one from the core business object model (BO1) and one from the business object extension (BO1 Extension). A similar problem can also arise when two extensions from different layers of a multi-layer architecture define an extension with the same name.

Figure 3:
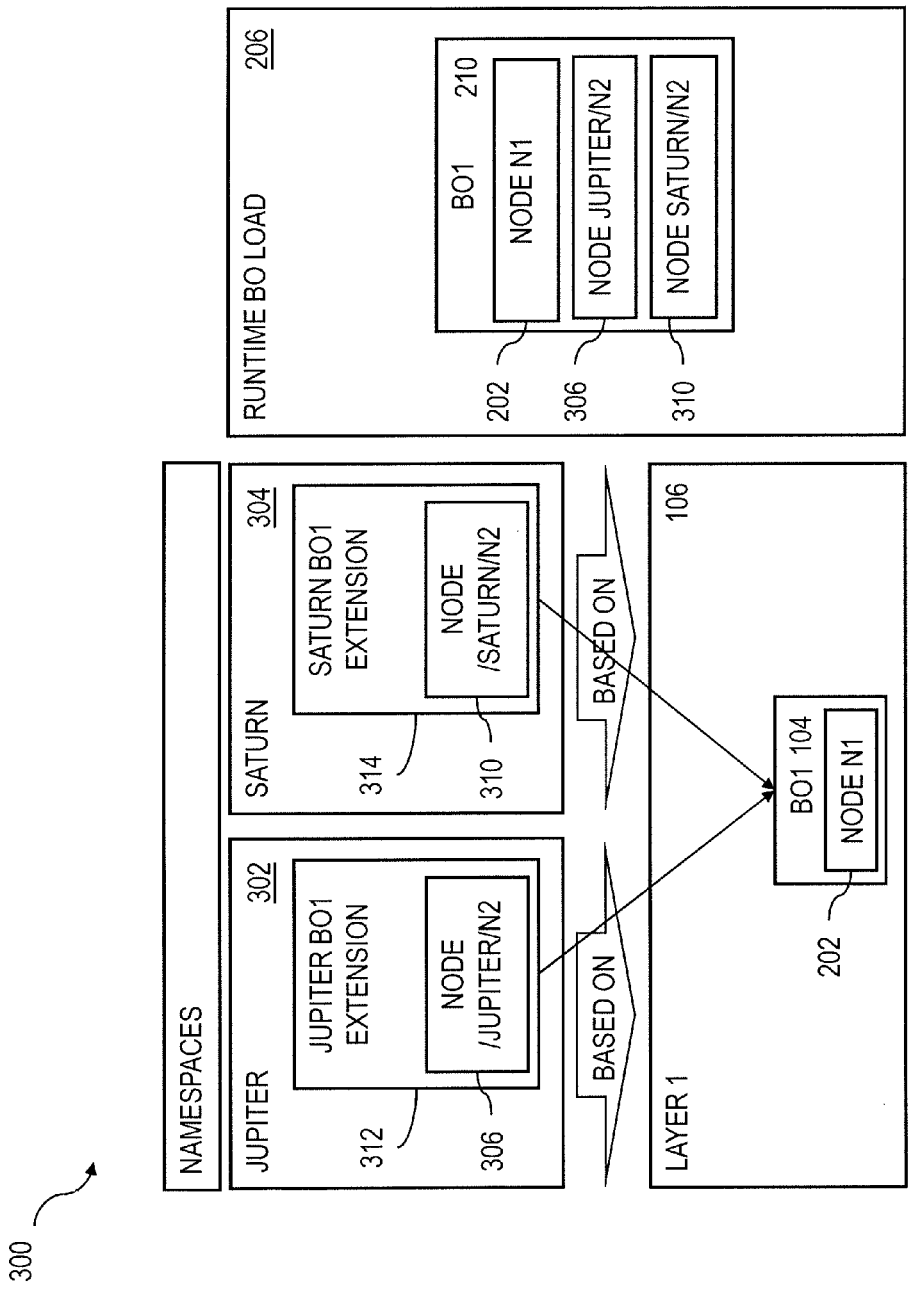
FIG. 3 is a diagram showing features relating to the use of namespaces consistent with implementations of the current subject matter.

To avoid such naming collisions, implementations of the current subject matter can make use of extensibility features incorporating a namespaces concept or otherwise implementing a set of namespace rules. FIG. 3 shows a layered software architecture 300 illustrating features consistent with this approach. In a software architecture based on the advanced business application programming (ABAP) language, each 30 character name (CHAR 30) can begin with an ABAP namespace. This namespace can start and end with a backslash ("/") and can contain at maximum 8 characters in between the backslashes, (e.g. /NSPCE/). Entities with 30 character (CHAR 30) ABAP names can therefore take the general form of "/NSPACE/ENTITY_NAME".

Using the extensible markup language (XML), for example in metadata repository system (MDRS) business objects, data types and various other entities can include an additional naming concept. In addition to the CHAR 30 ABAP name, which is always upper case per convention, an entity in an MDRS or similar system using XML can include an XML Name (Upper/Lower case supported, length 120), and an XML namespace (Upper/Lower case supported, length 120). Therefore, ABAP and XML namespaces can be used to avoid naming collisions since each extender can use a namespace. Further with reference to FIG. 3, the layered software architecture can include a first layer 106 as discussed above, and the first layer (e.g. a core development layer or foundation layer) 106 can include a first business object 104, which can include a first node (N1) 202. A first partner company (Jupiter) can create new entities in a namespace called "JUPITER" 302, which can have an ABAP namespace: /JUPITER/ and an XML Namespace: http://jupiter.com. A second partner company (Saturn) can create new entities in a namespace called "SATURN" 304, which can have an ABAP namespace:/SATURN/and an XML Namespace: http://saturn.com.

If each partner adds a respective new node N2 306, 310 as part of respective first business office extensions 312, 314, a naming collision could occur without the use of namespaces. However, with a namespace concept consistent with implementations of the current subject matter, naming collisions can be avoided because the run time version 210 of the first business object in the run time BO load 206 includes three different nodes with three different names: a first node (N1) 202 as defined in the core business object model of the first business object (BO1) 104, a second node (/JUPITER/N1) 306 as defined by the first partner (Jupiter), and a third node (/SATURN/N1) 310 as defined by the second partner (Saturn).

A similar approach can apply for XML naming and namespaces of the respective nodes. The first node (N1) 202 can be named as defined in the core business object model of the first business object (BO1) 104, the second node 306 can be named http://jupiter.com as defined by the first partner (Jupiter), and the a third node 310 can be named http://saturn.com as defined by the second partner (Saturn).

Figure 4:
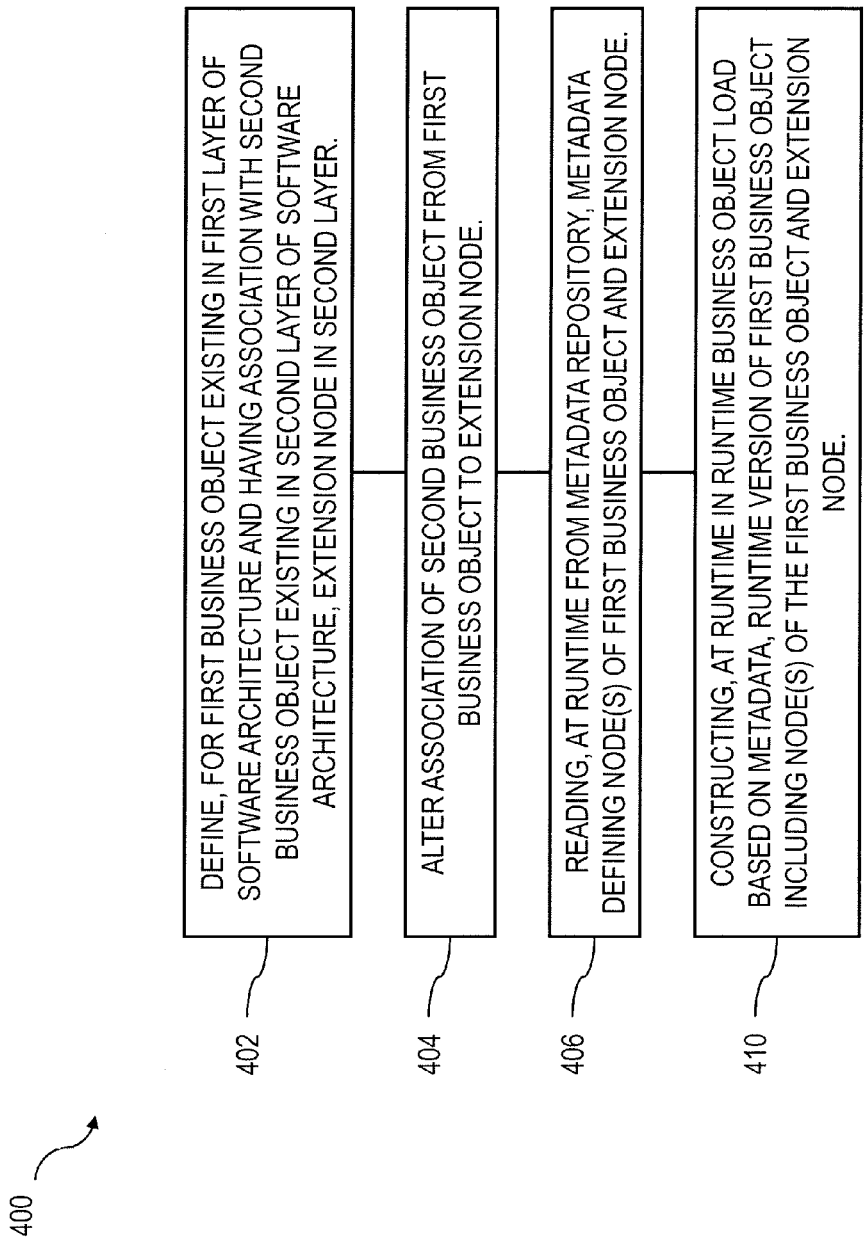
FIG. 4 is a process flow diagram illustrating aspects of a method having one or more features consistent with implementations of the current subject matter.

FIG. 4 shows a process flow chart 400 illustrating method features, one or more of which can be included in an implementation of the current subject matter. At 402, an extension node can be defined in a second layer of a software architecture. The extension node can be defined for a first business object existing in a first layer of the software architecture and having an association with a second business object existing in a second layer of the software architecture. At 504, the association of the second business object can be altered from the first business object to the extension node. At run time, metadata defining one or more nodes of the first business object and the extension node can be read at 506 from a metadata repository. Also at run time, a run time version of the first business object can be constructed in a run time business object load based on the metadata. The run time version of the first business object can include the one or more nodes of the first business object and the extension node.

Figure 5:
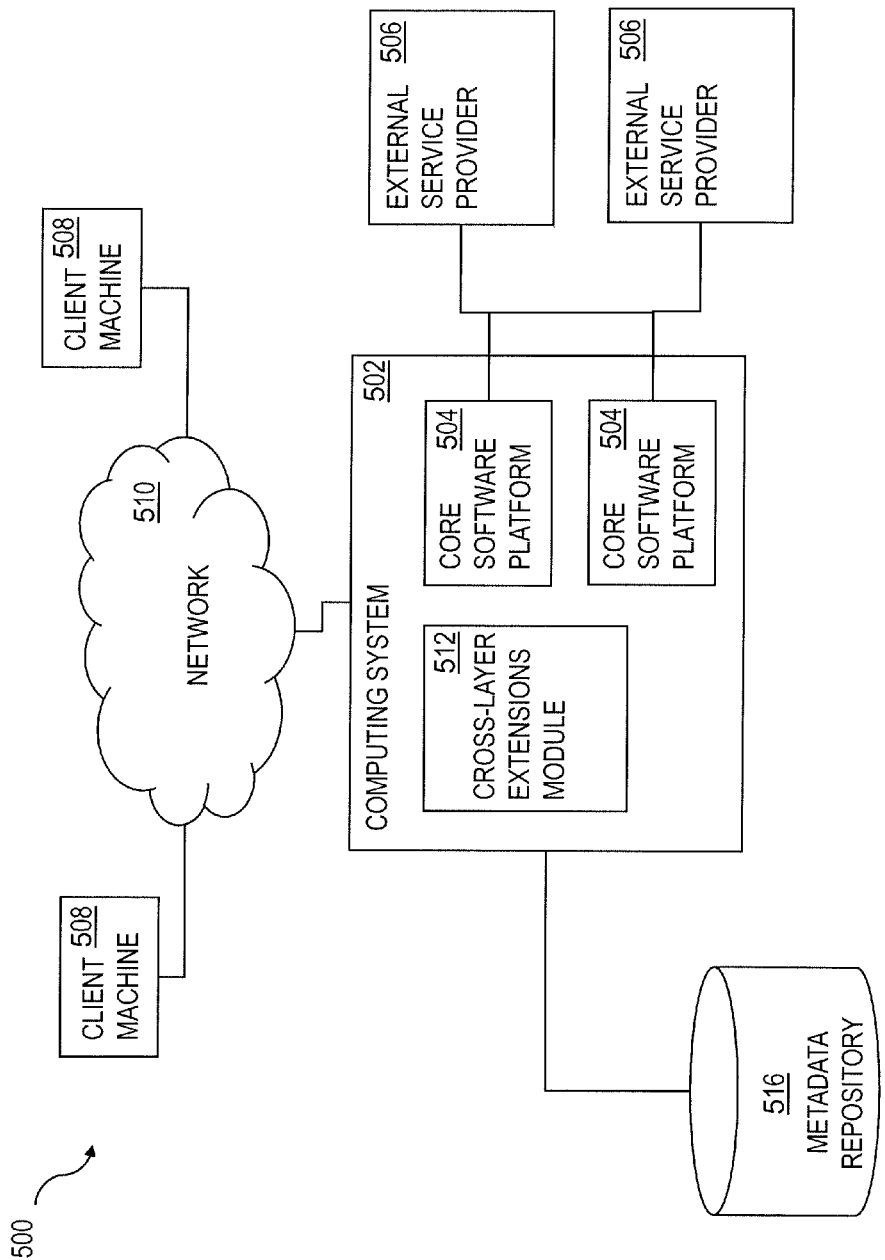
FIG. 5 is a diagram illustrating aspects of an example of a software architecture showing features consistent with implementations of the current subject matter.

The core software platform of an enterprise resource planning (ERP) system, other business software architecture, or other database functionality can in some implementations be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available business software solution to work with organization-specific business processes and functions is feasible. FIG. 5 shows a diagram of a system consistent with such an implementation. A computing system 502 can include one or more core software platform modules 504 providing one or more features of the business software system. In some implementations, the computing system 502 can be an application server. The computing system 502 can also aggregate or otherwise provide a gateway via which users can access functionality provided by one or more external service providers 506. Examples of external service providers 506 can include one or more computing systems supporting database functionality or other software functionality created or provided from a partner or other third party software developer. This external service provider database functionality or other software functionality can be provided over either direct or networked connections if the one or more external provider computing systems are separate from the computing system 502 that includes one or more core software platform modules 504. Alternatively, the external service provider database functionality or other software functionality can be hosted on the computing system 502 that includes the one or more core software platform modules 504.

Client machines 508 can access the computing system, either via a direct connection, a local terminal, or over a network 510 (e.g. a local area network, a wide area network, a wireless network, the Internet, or the like). A cross-layer extensions module 512 or multiple such modules can execute on the computing system 502, on one or more separate systems, or any combination thereof to perform one or more of the cross-layer extension management operations discussed in greater detail elsewhere herein. For the remainder of this disclosure, the cross-layer extensions module 512 will be discussed in the singular. However, it will be readily understood that one or more features of the methods, techniques, approaches, etc. relating to functionality ascribed to a single cross-layer extensions module 512 can be performed by multiple modules, which can be implemented within a single system that includes one or more processors or on multiple systems that each include one or more processors. The cross-layer extensions module 512 can access one or more metadata repositories 516 (referred to generally herein in the singular as a metadata repository 516), which can retain one or more of metadata for use by at least one of the one or more core software platform modules 504 and the database functionality or other software functionality provided by one or more external service providers 506. The one metadata repository 516 can also retain metadata relating to the core business object model in a first (e.g. a foundation) layer of the layer business software architecture and metadata relating to the cross-layer extensions to the core business object model. The metadata repository 516 can also store objects or other elements, such as for example business objects, metadata objects, or the like. These objects or other elements can include definitions of business scenarios, business processes, and one or more business configurations as well as data, metadata, master data, etc. relating to definitions of the business scenarios, business processes, and one or more business configurations, and/or concrete instances of the data objects (e.g. business objects) that are relevant to a specific instance of the business scenario or a business process. In some implementations, a business object or other metadata object can include a template definition of a standard business process or other related functionality. The template definition can optionally be modified via one or more extensions that can also be stored in the one or more repositories 516. The one or more repositories can also include storage for data relating to the business or other aspects of the organization.

Smaller organizations can also benefit from use of business software functionality. However, such an organization may lack the necessary hardware resources, IT support, and/or consulting budget necessary to make use of a standalone business software architecture product and can in some cases be more effectively served by a software as a service (SaaS) arrangement in which the business software system architecture is hosted on computing hardware such as servers and data repositories that are maintained remotely from the organization's location and accessed by authorized users at the organization via a thin client, such as for example a web browser, over a network.

In a software delivery configuration in which services of an business software system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 6:
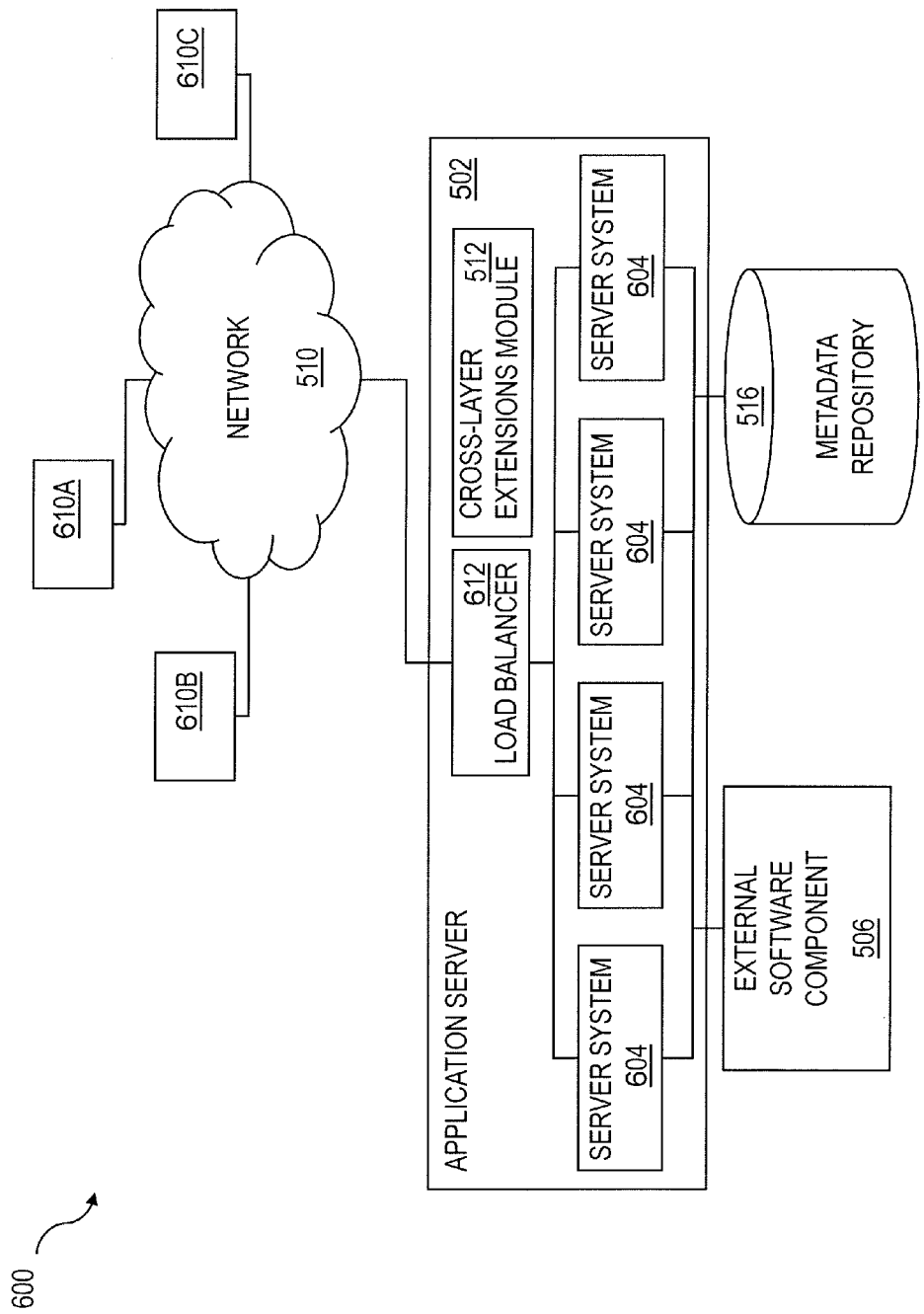
FIG. 6 is a diagram illustrating aspects of another example of a software architecture showing features consistent with implementations of the current subject matter.

FIG. 6 shows a block diagram of a multi-tenant implementation of a software delivery architecture 600 that includes an application server 602, which can in some implementations include multiple server systems 604 that are accessible over a network 606 from client machines operated by users at each of multiple organizations 610A-610C (referred to herein as "tenants" of a multi-tenant system) supported by a single software delivery architecture 600. For a system in which the application server 602 includes multiple server systems 604, the application server can include a load balancer 612 to distribute requests and actions from users at the one or more organizations 610A-610C to the one or more server systems 604. Instances of the core software platform 504 (not shown in FIG. 6) can be executed in a distributed manner across the server systems 604. A user can access the software delivery architecture across the network using a thin client, such as for example a web browser or the like, or other portal software running on a client machine. The application server 602 can access data and data objects stored in one or more metadata repositories 516 which can make one or more of metadata and other data available for use by at least one of the one or more core software platform modules 504 and the database functionality or other software functionality provided by one or more external service providers 506. The application server 602 can also serve as a middleware component via which access is provided to one or more external software components 506 that can be provided by third party developers.

As in the standalone system 500 of FIG. 5, a cross-layer extensions module 512 or multiple such modules can execute on the computing system 502, on one or more separate systems, or any combination thereof to perform as discussed elsewhere herein. The cross-layer extensions module 512 can access a metadata repository 516, which, as noted above, can be part of or directly accessible to the application server 602, or, alternatively or in addition, can be located remotely or optionally spread over one or more physical or virtual servers, for example as in a cloud computing arrangement. The cross-layer extensions module or modules 512 can execute on the application server 602, on one or more separate application servers, or any combination thereof to perform one or more of the operations discussed in greater detail above. The metadata repository 516 can store metadata similar to that discussed above in reference to FIG. 5.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 602 that includes multiple server systems 604 that handle processing loads distributed by a load balancer 612. Potential benefits from such an arrangement can include, but are not limited to, high and reliably continuous application server availability and minimization of unplanned downtime, phased updating of the multiple server systems 604 to permit continuous availability (one server system 604 can be taken offline while the other systems continue to provide services via the load balancer 612), scalability via addition or removal of a server system 604 that is accessed via the load balancer 612, and de-coupled life cycle events or processes (such as for example system maintenance, software upgrades, etc.) that enable updating of the core software independently of tenant-specific customizations implemented by individual tenants.

As in the example illustrated in FIG. 5, the repository 516 can store a business object that represents a template definition of a standard business process. Each individual tenant 610A-610C can customize that standard template according to the individual business process features specific to business of the organization to which that tenant is assigned. Customizations can be stored as extensions in the metadata repository.

Figure 7:
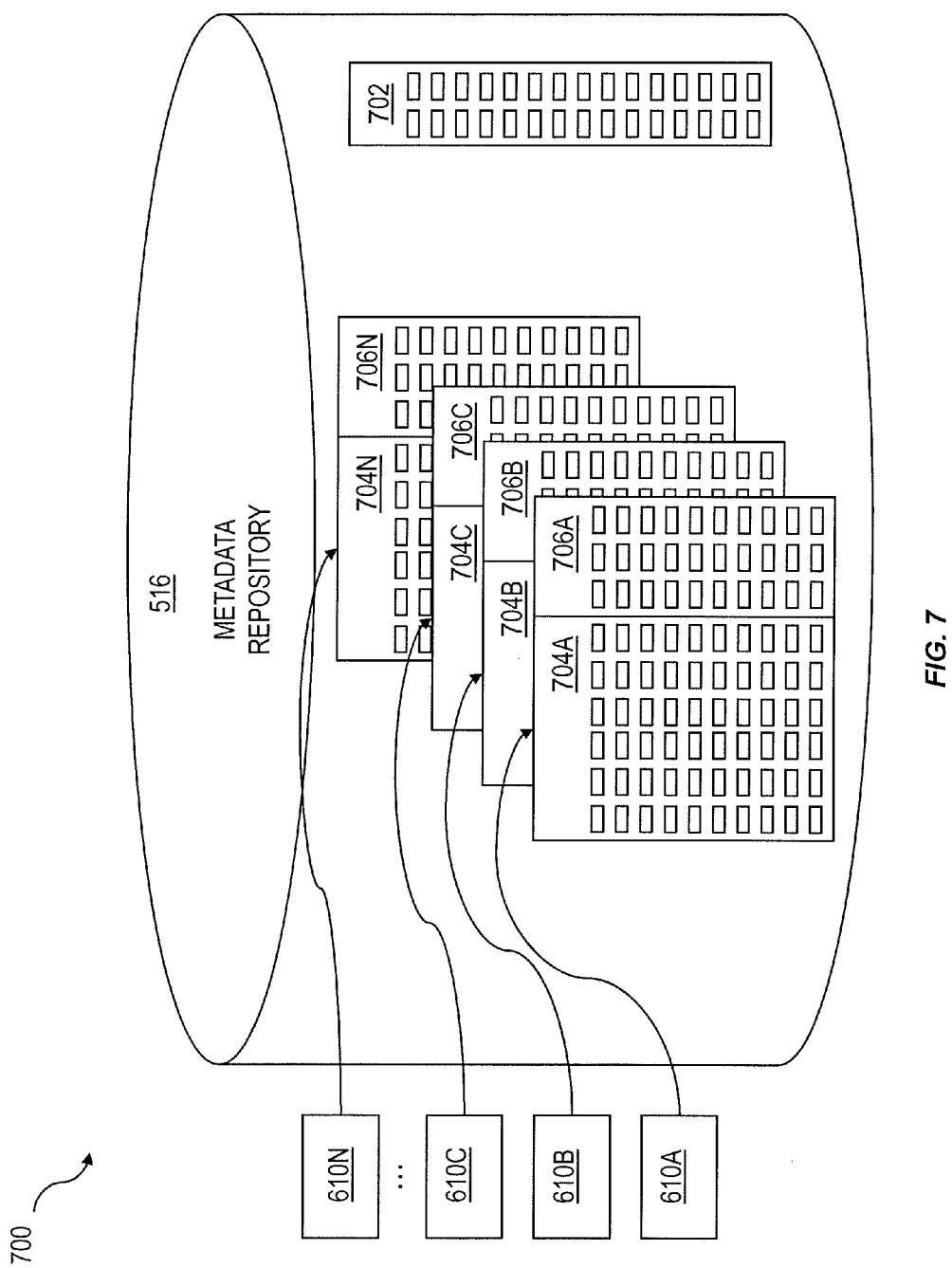
FIG. 7 is a diagram illustrating aspects of a repository showing features consistent with implementations of the current subject matter.

To provide for customization of the business process for each of multiple organizations supported by a single software delivery architecture 600, the data and data objects stored in the metadata repository 516 and/or other data repositories that are accessed by the application server 602 can include three types of content as shown in FIG. 7: core software platform content 702 (e.g. a standard definition of a business process), system content 704, and tenant content 706. Core software platform content 702 includes content that represents core functionality and is not modifiable by a tenant. System content 704 can in some examples be created by the run time of the core software platform and can include core data objects that store concrete data associated with specific instances of a given business process and that are modifiable with data provided by each tenant. Metadata relating to one or more of core software platform content 702, system content 704, and content provided by the one or more external service providers 506 can optionally be part of a system tenant that is accessible from all other tenants 610A-610N.

The data and/or the metadata retained in the tenant content 706 can be tenant-specific: for example, each tenant 610A-610N can store information about its own inventory, sales orders, etc. as well as metadata pertaining to extensions, processes, or the like that are specific to the organization assigned to that tenant. Tenant content 706A-706N can therefore include data objects or extensions to other data objects that are customized for one specific tenant 610A-610N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 706 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 702 and system content 704 and tenant content 706 of a specific tenant are accessed to provide the business process definition and/or the status information relating to a specific instance of the business process according to customizations and business data of that tenant such that each tenant is provided access to a customized solution whose data are available only to users from that tenant.

One or more life cycle events or processes of an application server 502 can cause invalidation of the metadata retained in a buffer 512. A life cycle event in this context can refer to one or more of an import, an upgrade, a hot fix, or the like of one or more business objects or other data objects into a core software platform module 504 of a business software architecture or the database functionality or other software functionality provided by one or more external service providers 506. In the example of a multi-tenant approach such as described above in reference to FIG. 6 and FIG. 7, life cycle events affecting features of one or more core software platform modules 504 or of database functionality or other software functionality provided by one or more external service providers 506 can be performed in the system tenant. Similarly, other life cycle events that affect multiple tenants (e.g. scalable add-ons that can be active in multiple tenants) can also be performed on the system tenant. Life cycle events that affect only one tenant, for example upgrading, importing, hot fixing, etc. of an add-on or other custom feature that is used by only a single customer of the business software architecture; switching on or of a scalable add-on functionality for a single tenant; creating or modifying an extension to core software platform content 702, system content 704, or database functionality or other software functionality provided by one or more external service providers 506; or the like can be implemented only in the affected tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A computer program product comprising a non-transitory machine-readable medium storing instructions that, when executed by at least one programmable processor, cause the at least one programmable processor to perform operations comprising:
    defining, for a first business object existing in a first layer of a software architecture and having an association with a second business object existing in a second layer of the software architecture, an extension node in the second layer, the extension node comprising a business object model that extends a core business object model of the first business object and delta information reflecting the association of the first business object with the second business object, the extension node being located in a package and software component of the second layer to allow transport of the extension node separately from the first layer;

altering the association of the second business object from the first business object to the extension node;

adding a tenant-specific extension to the first business object as part of the extension node in the second layer;

reading, at runtime from a metadata repository, metadata defining one or more nodes of the first business object and the extension node;

constructing, at runtime in a run time business object load, a run time version of the first business object based on the metadata, the run time version of the first business object comprising the one or more nodes of the first business object and the extension node, wherein the run time version of the first business object contains the tenant-specific extension and appears to a user as though the tenant-specific extension were defined as part of a core business object model of the first business object provided as part of a core software platform on the business software architecture.

2. The computer program product as in claim 1, wherein the association comprises at least one of a dependency of the second business object on the first business object and a reference from the second business object to the first business object.

3. The computer program product as in claim 1, wherein the operations further comprise: assigning a name to the extension node using a set of namespace rules to avoid naming collisions between the extension node and any other extension node in the software architecture.

4. A system comprising:

at least one programmable processor; and a machine-readable medium storing instructions that, when executed by the at least one programmable processor, cause the at least one programmable processor to perform operations comprising:

defining, for a first business object existing in a first layer of a software architecture and having an association with a second business object existing in a second layer of the software architecture, an extension node in the second layer, the extension node comprising a business object model that extends a core business object model of the first business object and delta information reflecting the association of the first business object with the second business object, the extension node being located in a package and software component of the second layer to allow transport of the extension node separately from the first layer;

altering the association of the second business object from the first business object to the extension node;

adding a tenant-specific extension to the first business object as part of the extension node in the second layer;

reading, at runtime from a metadata repository, metadata defining one or more nodes of the first business object and the extension node;

constructing, at runtime in a run time business object load, a run time version of the first business object based on the metadata, the run time version of the first business object comprising the one or more nodes of the first business object and the extension node, wherein the run time version of the first business object contains the tenant-specific extension and appears to a user as though the tenant-specific extension were defined as part of a core business object model of the first business object provided as part of a core software platform on the business software architecture.

5. The system as in claim 4, wherein the association comprises at least one of a dependency of the second business object on the first business object and a reference from the second business object to the first business object.

6. The system as in claim 4, wherein the operations further comprise: assigning a name to the extension node using a set of namespace rules to avoid naming collisions between the extension node and any other extension node in the software architecture.

7. A computer-implemented method comprising:

defining, for a first business object existing in a first layer of a software architecture and having an association with a second business object existing in a second layer of the software architecture, an extension node in the second layer, the extension node comprising a business object model that extends a core business object model of the first business object and delta information reflecting the association of the first business object with the second business object, the extension node being located in a package and software component of the second layer to allow transport of the extension node separately from the first layer;

altering the association of the second business object from the first business object to the extension node;

adding a tenant-specific extension to the first business object as part of the extension node in the second layer;

reading, at runtime from a metadata repository, metadata defining one or more nodes of the first business object and the extension node;

constructing, at runtime in a run time business object load, a run time version of the first business object based on the metadata, the run time version of the first business object comprising the one or more nodes of the first business object and the extension node, wherein the run time version of the first business object contains the tenant-specific extension and appears to a user as though the tenant-specific extension were defined as part of a core business object model of the first business object provided as part of a core software platform on the business software architecture.

8. The computer-implemented method as in claim 7, wherein the association comprises at least one of a dependency of the second business object on the first business object and a reference from the second business object to the first business object.

9. The computer-implemented method as in claim 7, further comprising: assigning a name to the extension node using a set of namespace rules to avoid naming collisions between the extension node and any other extension node in the software architecture.

10. The computer-implemented method as in claim 7, wherein at least one of the defining, the altering, the reading, and the constructing is performed by a system comprising at least one programmable processor.

* * * * *